United States Patent
Brunner et al.

[11] Patent Number: 5,927,417
[45] Date of Patent: Jul. 27, 1999

[54] SERIES HYBRID TRACTION ASSEMBLY AND VEHICLE COMPRISING SUCH AN ASSEMBLY

[75] Inventors: Raphaël Brunner, Studen b. Biel; Robert Apter, Yverdon-les-Bains, both of Switzerland

[73] Assignee: SMH Management Services AG, Biel, Switzerland

[21] Appl. No.: 08/912,851

[22] Filed: Aug. 19, 1997

[30] Foreign Application Priority Data

Aug. 27, 1996 [FR] France ................................. 96 10477

[51] Int. Cl.⁶ ........................................................ B60K 1/02
[52] U.S. Cl. ............................ 180/65.6; 180/65.3; 180/374
[58] Field of Search ................................. 180/65.3, 65.4, 180/65.6, 65.7, 374, 375

[56] References Cited

U.S. PATENT DOCUMENTS

| | | | |
|---|---|---|---|
| 1,251,749 | 1/1918 | Cilley | 180/65.6 |
| 1,481,405 | 1/1924 | Anglada | 180/65.6 |
| 1,810,834 | 6/1931 | Klein | 180/65.6 |
| 4,351,405 | 9/1982 | Fields et al. | 180/65 A |
| 4,953,646 | 9/1990 | Kim | 180/65.4 |
| 5,172,784 | 12/1992 | Varela, Jr. | 180/65.4 |
| 5,368,116 | 11/1994 | Iijima et al. | 180/65.4 |
| 5,495,906 | 3/1996 | Furutani | 180/65.4 |
| 5,550,445 | 8/1996 | Nii | 318/153 |
| 5,637,987 | 6/1997 | Fattic et al. | 180/65.3 |
| 5,650,713 | 7/1997 | Takeuchi et al. | 180/65.3 |
| 5,762,156 | 6/1998 | Bates et al. | 180/65.4 |

FOREIGN PATENT DOCUMENTS

| | | |
|---|---|---|
| 0 249 807 | 6/1987 | European Pat. Off. . |
| 0 543 390 | 5/1993 | European Pat. Off. . |
| 0 544 597 | 6/1993 | European Pat. Off. . |
| 328 430 | 1/1903 | France . |
| 24 04 427 | 8/1975 | Germany . |
| 95/33630 | 12/1995 | WIPO . |

*Primary Examiner*—Lanna Mai
*Assistant Examiner*—Michael Cuff
*Attorney, Agent, or Firm*—Griffin, Butler, Whisenhunt & Szipl, LLP

[57] ABSTRACT

The series hybrid traction assembly comprises an electric generator set, a static converter and at least one tandem traction set intended to drive two driving wheels of a vehicle. The traction set (1) comprises two back-gear motors each comprising an electric motor (4, 14) and a reducing gear (7, 17) which drives the wheel by means of a transmission shaft. The two reducing gears are adjacent to a median plane (24). The motor driving the wheel situated on one side of the median plane is on the other side of such plane, so that each driving line preferably has a Z-shaped outline and the axial space requirement of the traction set is reduced. The assembly also comprises a generator set (40) formed of a heat engine (41) and a generator (42), this set being arranged facing one (4) of the electric motors, on the other side of the median plane. A very compact assembly results.

12 Claims, 2 Drawing Sheets

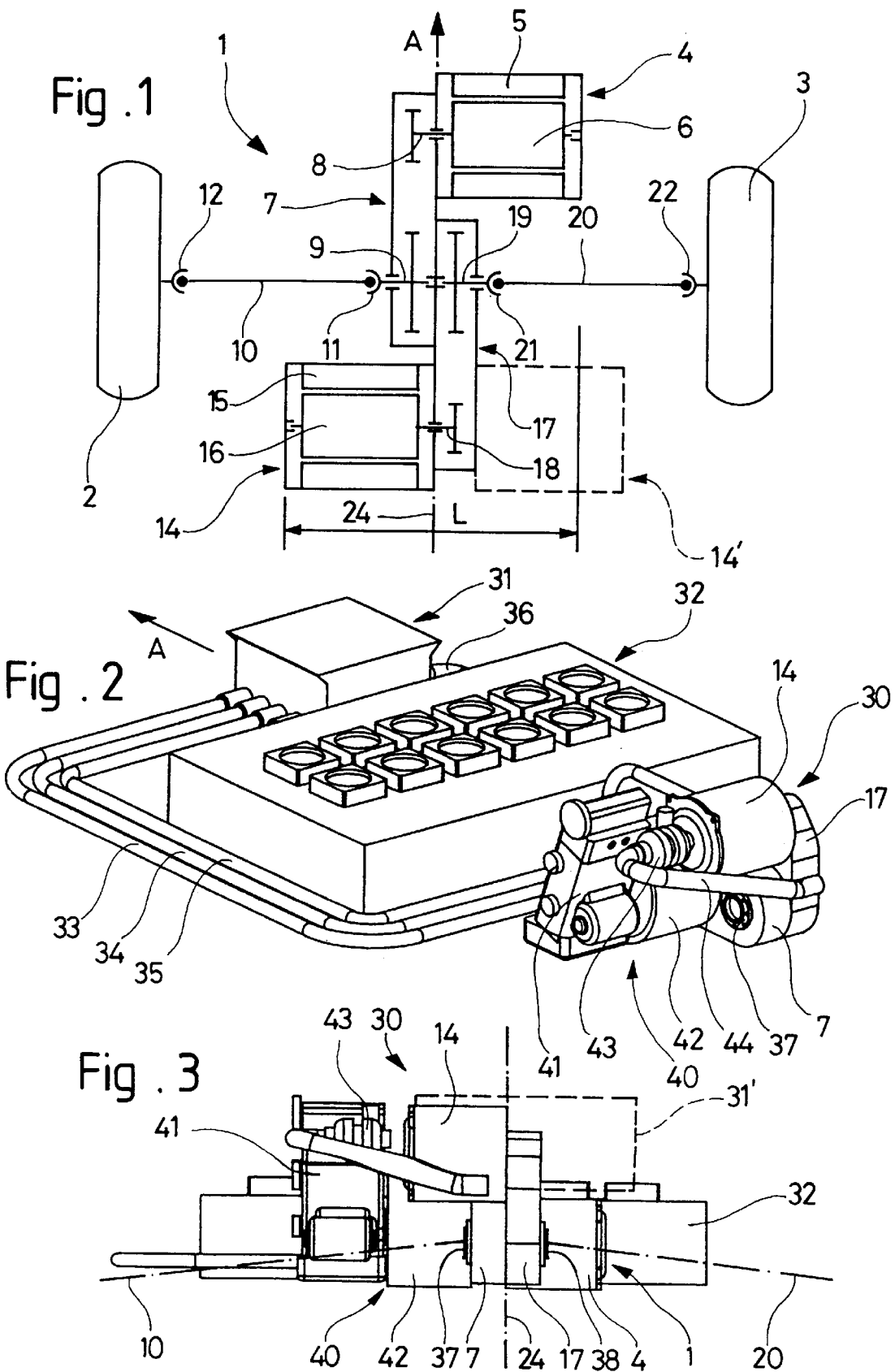

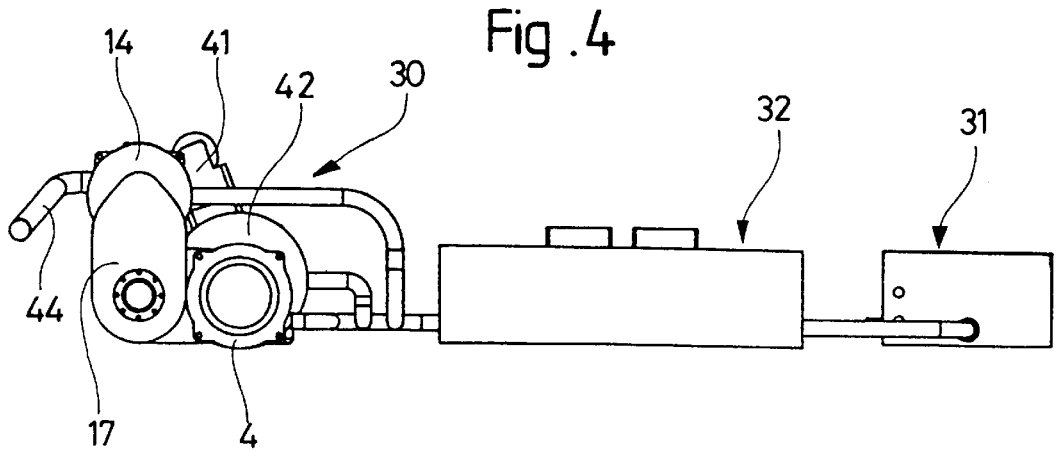
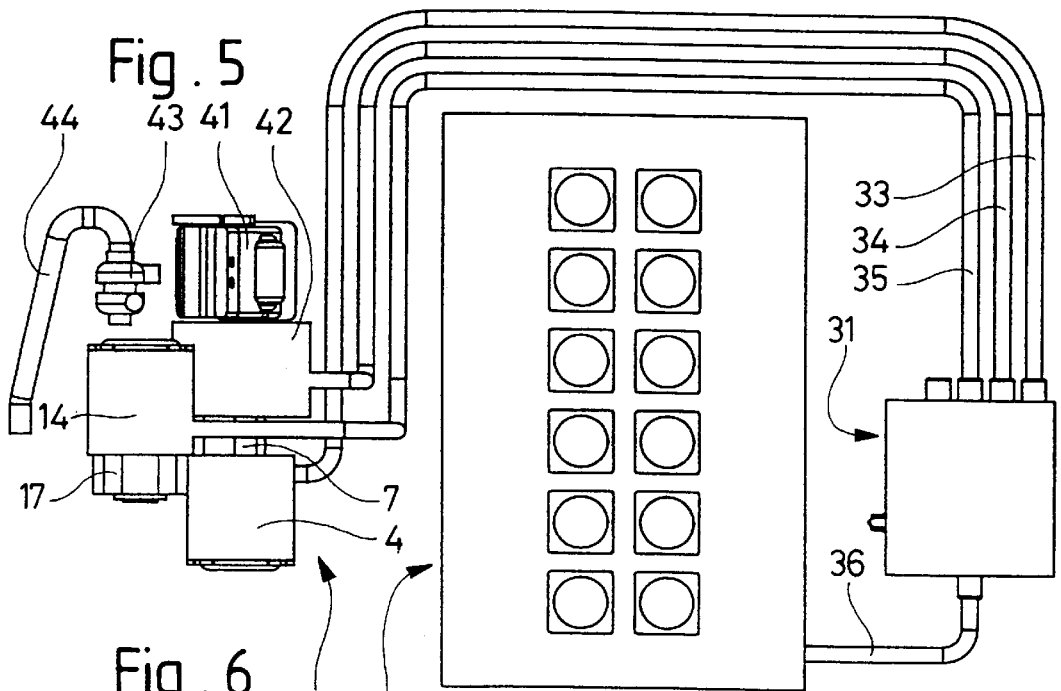
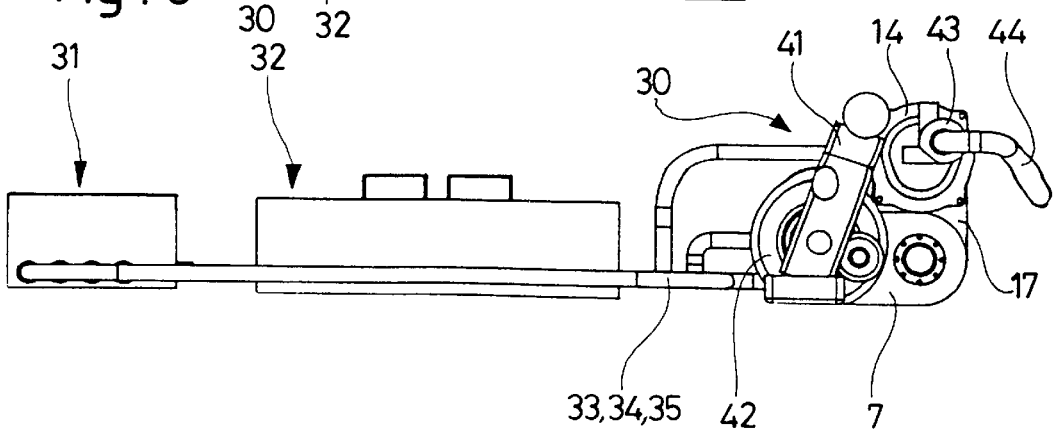

SERIES HYBRID TRACTION ASSEMBLY AND VEHICLE COMPRISING SUCH AN ASSEMBLY

BACKGROUND OF THE INVENTION

The present invention relates to a series hybrid traction assembly for a motor vehicle, said assembly comprising an electric generator set, at least one dual traction set comprising two electric motors driving respective second shafts aligned with each other and coupled respectively to a left wheel and a right wheel of the vehicle, and at least one static converter connected in series between the generator set and the tandem traction set.

The invention also relates to a series hybrid vehicle comprising such a traction assembly.

In most cases, the drive wheels driven by a dual electric traction set are coupled to the second shafts of the set by means of articulated transmission shafts providing sufficient angular play for the suspension clearance, and for the angle of lock of the wheels if they are leading wheels. It is important that these transmission shafts have the longest length possible, in order to reduce the maximum angle of the articulation joints, i.e. it is desirable for the traction set outputs to be as close as possible to each other.

U.S. Pat. No. 5,172,784 discloses a motor vehicle having a drive system of the kind indicated hereinabove, wherein the dual traction set comprises two coaxial electric motors, having a common stator and two rotors aligned with each other which each drive a rear wheel via a corresponding shaft. The generator set, formed in this case by an external combustion engine associated with a linear generator, is placed in the front of the vehicle. It supplies the electric motors through a converter assembly placed partly in the middle and partly at the rear of the vehicle. An auxiliary battery capable of providing reserve drive energy is placed in front of the rear axle.

The traction set provided in the aforementioned Patent unfortunately requires too much space to be used in a small vehicle, in particular because its axial length is equal to the sum of the lengths of the two motors, which excessively reduces the length of the transmission shafts. Further, since the motors rotate at the same speed as the wheels, they have to have a relatively large diameter to provide sufficient torque.

It is possible to overcome these drawbacks by using reducing gears. Each drive wheel is then driven by a back-geared motor comprising an electric motor and an appropriate reducing gear. U.S. Pat. No. 4,351,405 proposes simply to omit the transmission shafts and replace each of them with a reducing gear, but this solution is unsatisfactory from the point of view of the suspension. On the other hand, since it concerns a parallel hybrid traction vehicle, the heat engine is placed close to the other axle, which it drives directly.

A better solution is disclosed in French Patent 328 430, which concerns an electric car with a rigid driving axle. A reducing gear is associated with each wheel of this axle and it is connected, by a long articulated transverse shaft, to the corresponding motor which is placed close to the other wheel, i.e. the two shafts pass through almost the entire vehicle, respectively in front of and behind the rigid axle. This arrangement remains nonetheless bulky and the reducing gears are not suspended.

In the electric vehicle forming the subject of Patent Application EP 0 544 597, the traction set placed in the middle of the width of the vehicle comprises two motors arranged in parallel one in front of the other, and two reducing gears arranged respectively to the left and right. The axial length of this set is thus quite large, which restricts that of the transmission shafts.

Patent application EP 0 249 807 discloses a dual traction set with reducing gears wherein the two back-geared motors are arranged symmetrically to each other with respect to the median plane, their reducing gears being juxtaposed along this plane within a common casing. The two electric motors, which are of the external rotor type, are arranged along a same axis as the reducing gear first shafts, each motor being on the same side of the median plane as the wheel which it drives. The axial length of the traction set, in the transverse direction of the vehicle, is equal to the sum of the axial lengths of the two reducing gears and the two electric motors. The traction set consequently requires a relatively large space, on both sides of the median plane which is usually in the middle of the width of the vehicle, which may prevent other relatively thick elements being mounted at the side of the traction set. In particular, in a hybrid traction vehicle, it becomes difficult to install the heat engine in the same compartment of the body of the vehicle.

Patent Application DE 24 04 427 discloses, for a purely electric lifting truck, a similar traction set, but wherein the two motors are on the same side of a common reducing gear casing, in order to facilitate their accessibility for maintenance. There is no generator set in this vehicle.

SUMMARY OF THE INVENTION

The present invention aims to avoid the aforementioned drawbacks, by arranging the traction assembly in a particularly compact form, with a compact dual traction set in the axial direction of the electric motors and arranging space for the other components in the proximity of such motors, in particular on the sides, while keeping the reducing gear outputs as close as possible to each other, on a same transverse axis and in the proximity of the middle of the width of the vehicle.

According to another particular object of the invention, the mutual arrangement of the two back-gear motors should allow them to be juxtaposed with the generator set consisting of a heat engine and an electric generator to form a compact block, in a motor vehicle of the series hybrid or series-parallel mixed type. Since such a traction assembly generally comprises a frequency converter and an accumulator battery, the invention also aims to obtain an advantageous arrangement of this assembly within the vehicle.

According to a basic aspect of the present invention, a traction assembly of the type mentioned in the preamble is provided, wherein the traction set also comprises two back-gear motors each comprising one of the electric motors and a reducing gear provided with one of said second shafts and a first shaft coupled to a rotor of said electric motor, the first shaft of each reducing gear being parallel to the second shaft and at a distance from the latter, the two reducing gears being arranged respectively either side of a median plane, wherein, in at least one of the back-gear motors, the electric motor extends on the other side of said median plane with respect to the reducing gear, the two electric motors not being aligned with each other, and wherein the generator set is arranged substantially facing one of the electric motors, on the other side of the median plane with respect to such motor.

There results an approximately Z shaped spatial arrangement of at least one kinematical chain driving the corresponding drive wheel, i.e. the chain comprising an electric motor, the associated reducing gear and the transmission shaft coupled to the reducing gear output, and the two kinematical chains extending in different planes although their lower branches, representing the second shafts and the transmission shafts, are generally coaxial. Since the two electric motors are not placed in prolongation of each other, each of them may be adjacent to the corresponding reducing gear in the median plane of the traction set, so that the axial space requirement of the assembly of the two back-gear motors does not exceed the length of an electric motor on each side of the median plane. Moreover, the axial space requirement of the set as regards each electric motor is even smaller since it is reduced to the sum of the axial length of one motor and one reducing gear. Since the axial length of the reducing gears is relatively small and each reducing gear is adjacent to the median plane, plenty of space remains beside it at the level of its first shaft, on the opposite side to the electric motor. This space is occupied by the electric generator set, to form a very compact assembly which may be housed between the two driving wheels which it drives. More particularly, such a generator set usually consists of a heat engine and an electric generator coupled to the heat engine shaft, the generator set being connected to the electric motors via a static converter. The heat engine shaft and the generator are preferably arranged substantially at the level of the second shafts.

The two back-gear motors preferably have the Z arrangement described hereinbefore, so that they may be substantially identical. The two electric motors are then respectively situated either side of the median plane and the global length of the traction set is equal to the sum of the lengths of the two motors.

A series hybrid vehicle according to the invention comprises a traction assembly as described hereinbefore. The traction set is preferably coupled to the rear wheels of the vehicle, while the converter may be placed at the front of the vehicle and connected to an electric accumulator battery placed between the converter and the traction set.

BRIEF DESCRIPTION OF THE DRAWINGS

Other features and advantages of the present invention will appear in the following description of a preferred embodiment, given by way of non limiting example with reference to the attached drawings, in which:

FIG. 1 is a diagram illustrating the basic principles of a dual electric traction set used in the present invention, FIG. 2 is a perspective view of a series hybrid traction assembly for a motor vehicle according to the invention, FIG. 3 is a elevation view of the rear of the assembly of FIG. 2, FIG. 4 is a elevation view of the right side of the same assembly, FIG. 5 is a plane view of the same assembly, and FIG. 6 is a front view of the left side of the same assembly.

DETAILED DESCRIPTION OF THE PREFERRED EMBODIMENTS

The traction set 1 shown schematically in FIG. 1 is intended to drive jointly two drive wheels of the same axle of a motor vehicle, namely a left rear wheel 2 and a right rear wheel 3, the direction of the front being indicated by the arrow A. Left wheel 2 is driven by a first back-gear motor comprising a left electric motor 4, provided with a stator 5 and a rotor 6, and a left reducing gear 7 provided with a first shaft 8 coupled to rotor 6 and a second shaft 9 coupled to left wheel 2 by means of a left transmission shaft 10 fitted with two articulated joints 11 and 12. Likewise, right wheel 3 is driven by a second back-gear motor comprising a right electric motor 14, provided with a stator 15 and a rotor 16, and a right reducing gear 17 provided with a first shaft 18 coupled to rotor 16 and a second shaft 19 coupled to right wheel 3 by means of a right transmission shaft 20 fitted with two articulated joints 21 and 22. The outputs of the two reducing gears 7 and 17, formed by articulated joints 11 and 21, are relatively close to each other, on either side of a median plane 24 of traction set 1, the two reducing gears being applied against each other along this plane in the region of their second shafts 9 and 19. Reducing gears 7 and 17 may be identical or of different types, for example of the chain or gear train type, with one or more stages, provided that the second shaft is remote from the first shaft in each reducing gear.

According to a particularly advantageous feature of traction set 1, the input and output of each reducing gear 7, 17 are respectively situated on opposite faces of the reducing gear, so that each driving line of a wheel has a Z-shaped outline. Moreover, these two Z-shaped outlines overlap in some way as is shown in FIG. 1, which reduces the space requirement of the traction set in the axial direction, namely the direction of the parallel shafts of the electric motors and the reducing gears.

Thus, left electric motor 4 driving left wheel 2 is in fact situated to the right of median plane 24, whereas left reducing gear 7 and transmission shaft 10 are situated to the left of such plane. Likewise, right motor 14 is situated to the left of median plane 24, whereas right reducing gear 17 and transmission shaft 20 are to the right of such plane. Given that the two back-gear motors 4, 7 and 14, 17 cross each other, the total axial length L of the set which they form is equal only to the sum of the lengths of the two electric motors 4 to 14. In practice, L may be in the order of 40 cm. Moreover, the axial space requirement of set 1 is still less than this value L in each region of the set: in the region of second shafts 9 and 19, it is equal to the sum of the axial lengths of the two reducing gears, and in the region of each electric motor 4, 14, it is equal to the sum of the lengths of a motor and a reducing gear. There therefore remains plenty of free space beside traction set 1, in particular to the left of the left back-gear motor comprising motor 4 and reducing gear 7 and to the right of the right back-gear motor comprising motor 14 and reducing gear 17. This space may be advantageously used by additional components of the traction set, as will be described hereinafter.

It will be noted that median plane 24 of the traction set may coincide with the median longitudinal plane of the vehicle, but not necessarily. Since the outputs of the two reducing gears are quite close to each other, transmission shafts 10 and 20 may have different lengths, without the shorter being subjected to excessively pronounced inclinations. A slight offset of median plane 24 with respect to the middle of the vehicle offers even more available space on one side of traction set 1.

Another advantage of the crossed arrangement described hereinbefore lies in the possibility of placing the two electric motors 4 to 14 at different levels, as a function of the space available in the vehicle. If they are at the same level, FIG. 1 being then considered as a plane view, the vertical space requirement of set 1 is small, but its longitudinal space requirement is more significant. Since second shafts 9, 19 must generally be at as low a level as possible, it may be advantageous to place the axes of motors 4, 14 at a slightly higher level in order to remove such motors from the ground. One will describe hereinafter, with reference to other Figures, an arrangement wherein the Z-shaped outlines of the driving lines extend in the two respective perpendicular planes, one vertical and the other horizontal, resulting in great compactness of the traction set.

FIG. 1 also shows schematically an alternative embodiment where motor 14 driving right wheel 3 is placed in position 14' drawn in dotted lines, on the same side as this wheel 3 with respect to its reducing gear 17 and median plane 24. In this case, the kinematical chain driving the right wheel thus has an approximately C-shaped outline, whereas the other chain preserves a Z-shaped outline which covers a part of the C-shaped outline in the axial direction. The total axial space requirement of the set corresponds to the sum of the axial lengths of a motor and the two reducing gears. Since the two motors are situated to the right of median plane 24, plenty of available space remains to the left of such plane. The two motors may be next to each other, for example if position 14' of the right motor is provided above corresponding transmission shaft 20.

The traction assembly illustrated by FIGS. 2 to 6 comprises a dual traction set 1, a static converter 31 and an electric accumulator battery 32, which are connected by electric lines 33 to 36. Traction set 1 comprises all the elements described with reference to FIG. 1. The two electric motors 4 and 14, the two reducing gears 7 and 17 and median plane 24 in particular will be recognised in FIGS. 2 to 6. The references 37 and 38 indicate the respective outputs of reducing gears 7 and 17, to which are connected transmission shafts 10 and 20, which are shown schematically for the purposes of clarity of the drawing.

In addition to the aforementioned components, the hybrid traction assembly comprises a generator set 40 consisting of a heat engine 41 and an electric generator 42 fixed to said motor, the rotor of generator 42 being coupled directly to the crankshaft of engine 41. The opposite end of generator 42 may advantageously be fixed to the casing of left reducing gear 7, so that the assembly of generator set 40 and traction set 1 forms a compact block 30 which may be fixed to the body of the vehicle at three or four points only. Heat engine 41 may be of any known type, in particular an ICE of the Otto, Diesel or other type or a gas turbine. In the present case it is an ICE fitted with a turbocharger 43 connected to an exhaust circuit 44. The connections between turbocharger 43 and engine 41 are not shown in order to clarify the drawing. In this example, electric motors 4 and 14 are three-phase asynchronous motors (induction motors), which of course may also operate as generators in a regenerative electric braking mode. Generator 42 is preferably also of the three-phase asynchronous type. In a known manner, the current which its generates is transmitted by line 34 to an AC/DC converter incorporated in converter 31 to generate a DC voltage capable of charging battery 32 via line 36. This DC voltage, or the voltage supplied by battery 32 is transformed, by a DC/AC converter incorporated in converter 31, into a three-phase alternating current with variable voltage and variable frequency which supplies in parallel motors 4 and 14 via lines 33 and 35.

In traction set 1, the first back-gear motor formed of motor 4 and reducing gear 7 extends substantially horizontally, whereas the second back-gear motor formed of motor 14 and reducing gear 17 extends substantially vertically. Generator 42 is placed to the left of reducing gear 7, approximately in alignment with the first shaft of reducing gear 7, but on the opposite side to motor 4. Since its axial length is almost the same as that of electric motor 14 situated behind and slightly above the generator, said generator forms a compact assembly with the two back-gear motors and leaves enough space on its left for heat engine 41. The latter, despite its relatively large height, does not excess the upper level of electric engine 14, and furthermore, turbocharger 43 is advantageously placed in the vicinity of the exhaust head (not shown) of heat engine 41, beside electric motor 14 and above the left transmission shaft. As a result not only is block 30 very compact, but there is also easy access to all the components and the connecting pipes between them are of small length in the event that the components have a common water cooling circuit.

In the arrangement shown in FIGS. 2 to 6, converter 31 is placed in a front part of the vehicle (the front being indicated by arrow A in FIG. 2), either to take advantage of a separate cooling system, or because the available space at the rear is limited. Heavy battery 32 is preferably situated in a central part of the vehicle, between the converter and the traction set. If there is enough space at the rear, one may nonetheless place converter 31 in the proximity of block 30, for example above generator 42 and electric motor 4, in position 31' shown in dotted lines in FIG. 3. This arrangement is particularly advantageous in the case of a common cooling system.

The assembly described here may be subject to various alternatives. For example, the electric generator set may be a fuel cell. On the other hand, block 30 may be placed at the front of the vehicle and drive the front wheels.

It will also be noted that the traction assembly illustrated by FIGS. 2 to 6 could be completed by a second traction set, similar to that of FIG. 1, to drive the front wheels of a four wheel drive vehicle.

The present invention may be applied not only to road vehicles but also to working vehicles such as fork lift trucks.

What we claim is:

1. A series hybrid traction assembly for a motor vehicle, said assembly comprising an electric generator set, at least one traction set comprising two electric motors driving respective second shafts respectively aligned with each other and respectively coupled to a left wheel and a right wheel of the vehicle, and at least one static converter connected in series between said generator set and said traction set, wherein said traction set comprises two back-gear motors each comprising one of the electric motors and a reducing gear provided with one of said second shafts and a respective first shaft coupled to a rotor of said electric motor, the first shaft of each reducing gear being parallel to the second shaft thereof and at a distance from the latter, said two reducing gears being arranged respectively either side of a median plane and adjacent to each other in the region of said second shafts, and wherein, in at least one of said back-gear motors, the electric motor extends entirely on the other side of said median plane with respect to the reducing gear, said two electric motors not being aligned with each other, and wherein said generator set arranged substantially facing one of said electric motors, on the other side of said median plane with respect to such motor.

2. An assembly according to claim 1, wherein said two reducing gears are fixed to each other in the region of their second shafts.

3. An assembly according to claim 1, wherein said two electric motors are situated on different sides of said median plane, respectively.

4. An assembly according to claim 3, wherein said two back-gear motors are substantially identical.

5. An assembly according to claim 1, wherein a first plane, passing through said first and second shafts of one of said reducing gears, is substantially perpendicular to a second plane passing through said first and second shafts of the other reducing gear.

6. An assembly according to claim 5, wherein said first plane is substantially horizontal and said second plane is substantially vertical.

7. An assembly according to claim 1, wherein said generator set is formed of a heat engine and an electric generator coupled to an output shaft of said heat engine, and wherein said generator and said electric motor arranged facing the latter are substantially at the same level as said second shafts of said reducing gears.

8. An assembly according to claim 7, wherein said static converter extends above said generator.

9. An assembly according to claim 1, wherein said two electric motors are situated on the same side of said median plane.

10. A motor vehicle comprising a series hybrid traction assembly, said traction assembly comprising an electric generator set, at least one traction set comprising two electric motors driving respective second shafts respectively aligned with each other and respectively coupled to a left wheel and a right wheel of the vehicle, and at least one static converter connected in series between said generator set and said traction set, wherein said traction set comprises two back-gear motors each comprising one of the electric motors and a reducing gear provided with one of said second shafts and a respective first shaft coupled to a rotor of said electric motor, the first shaft of each reducing gear being parallel to the second shaft thereof and at a distance from the latter, said two reducing gears being arranged respectively either side of a median plane and adjacent to each other in the region of said second shafts, and wherein, in at least one of said back-gear motors, the electric motor extends on the other side of said median plane with respect to the reducing gear, said two electric motors not being aligned with each other, and wherein said generator set is arranged substantially facing one of said electric motors, on the other side of said median plane with respect to such motor.

11. A motor vehicle according to claim 10, wherein said traction set is coupled to rear wheels of the vehicle and wherein said static converter is placed at the front of the vehicle and connected to an electric accumulator battery situated between said converter and said traction set.

12. A motor vehicle according to claim 10, wherein said generator set is formed of a heat engine and an electric generator coupled to an output shaft of said heat engine, and wherein said generator and said electric motor arranged facing the latter are substantially at the same level as said second shafts of said reducing gears.

\* \* \* \* \*